(12) United States Patent
Okazaki

(10) Patent No.: US 7,677,550 B2
(45) Date of Patent: Mar. 16, 2010

(54) SHEET FEEDING APPARATUS AND IMAGE FORMING SYSTEM

(75) Inventor: Shigeru Okazaki, Musashimurayama (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 320 days.

(21) Appl. No.: 11/439,766

(22) Filed: May 24, 2006

(65) Prior Publication Data
US 2007/0045933 A1 Mar. 1, 2007

(30) Foreign Application Priority Data
Aug. 26, 2005 (JP) ............... 2005-245318

(51) Int. Cl.
*B65H 5/08* (2006.01)
(52) U.S. Cl. ......................................... 271/11; 271/104
(58) Field of Classification Search .................. 271/104, 271/94, 11
See application file for complete search history.

(56) References Cited

U.S. PATENT DOCUMENTS

| 3,980,292 | A | * | 9/1976 | Sakurai .................. 271/11 |
| 4,030,723 | A | | 6/1977 | Irvine et al. |
| 4,548,395 | A | * | 10/1985 | Snellman et al. ......... 271/11 |
| 4,596,385 | A | * | 6/1986 | Silverberg ............... 271/94 |
| 5,882,002 | A | * | 3/1999 | Kamei et al. ............ 271/118 |
| 6,042,099 | A | * | 3/2000 | Takagishi ............... 271/2 |
| 6,082,727 | A | | 7/2000 | Thompson |
| 6,345,818 | B1 | * | 2/2002 | Stephan et al. .......... 271/91 |
| 6,607,193 | B2 | * | 8/2003 | Nordling et al. ......... 271/99 |
| 7,144,009 | B2 | * | 12/2006 | Kim ..................... 271/276 |
| 7,198,264 | B2 | * | 4/2007 | Kashiba et al. .......... 271/11 |
| 2006/0290048 | A1 | * | 12/2006 | Dobashi ................ 271/94 |

FOREIGN PATENT DOCUMENTS

| EP | 0464851 | 1/1992 |
| EP | 0598272 | 5/1994 |
| JP | 04-371430 | 12/1992 |
| JP | 05-032356 | 2/1993 |
| JP | 08-188286 | 7/1996 |

* cited by examiner

*Primary Examiner*—Patrick H Mackey
*Assistant Examiner*—Michael C McCullough
(74) *Attorney, Agent, or Firm*—Lucas & Mercanti, LLP

(57) ABSTRACT

A sheet feeding apparatus includes: a sheet tray in which a plurality of sheets is to be stacked; a sheet feeding section which vacuums a sheet from the plurality of sheets stacked in the sheet tray and feeds the sheet to an image forming apparatus; a first sheet separator which has a member which separates each sheet from the plurality of sheets when the sheet feeding section feeds the plurality of sheets; and a second sheet separator which has a forward roller rotated in a sheet transport direction, which feeds the sheet to the image forming apparatus, and a parallel retard roller rotatable in an opposite direction so as to separate each sheet from the plurality of sheets.

14 Claims, 7 Drawing Sheets

SHEET FEEDING APPARATUS AND IMAGE FORMING SYSTEM

This application is based on Japanese Patent Application No. 2005-245318 filed on Aug. 26, 2005, which is incorporated hereinto by reference.

FIELD OF THE INVENTION

The present invention relates to an image forming apparatus such as a copying machine, a facsimile machine and a printer as well as a sheet feeding apparatus of the image forming system, and in particular, to an improvement of a sheet feeding apparatus aiming at and improvement of versatility for sheets.

BACKGROUND OF THE INVENTION

In an image forming system, there is generally provided a sheet feeding means that feeds out a sheet to an image forming section one by one from a sheet-feeding table that stores sheets. Though various types of sheet feeding means have been put to practical use as this sheet feeding means, an FRR sheet feeding system (Feed and Reverse Roller system) or an air suction belt sheet feeding system is mainly used.

A sheet feeder of the FRR system is constructed with a pick-up roller that comes in contact with the uppermost portion of sheets placed on a sheet-feeding table, and draws a sheet out of the sheet-feeding table by frictional force, a feed roller that feeds out the sheet drawn out to a sheet conveyance path, and a separation roller that contacts the feed roller at a prescribed pressure and is driven to rotate in the direction opposite to the sheet conveyance direction through torque limiter.

In the sheet feeder, when the separation roller is in contact with the feed roller and when only one sheet passes through a nip between both rollers, the separation roller is driven by the feed roller through a slip of the torque limiter to rotate in the sheet conveyance direction to feed out the sheet in the conveyance direction. However, when two or more sheets pass through the nip between both rollers, rotation drive torque of the separation roller overcomes the frictional force between the two sheets to cause them to slide each other and thereby to return the sheet that is in contact with the separation roller toward the sheet-feeding table, whereby, the sheets which are in close contact are separated.

In the sheet feeder of an air suction belt sheet feeding system, on the other hand, air blows against an edge portion of the sheet from a blower fan to lift the leading edge of the sheet and to separate the sheets simultaneously. The lifted sheet is vacuumed by a suction belt or by a suction roller to be fed out to a sheet conveyance path, and when two or more sheets are vacuumed and conveyed, a sheet separating pad made of rubber material (advance-resisting member) that is provided to close a sheet path prevents sheets other than the topmost sheet from being fed forcibly, in the structure.

In particular, compared with other methods, the sheet feeder of the FRR system has versatility for a range of sheet types to be applied, and various improvements and proposals have been made for improving reliability for sheet feeding functions relating to this method. For example, in Japanese Unexamined Patent Publication No. 05-32356, there is proposed an apparatus wherein a double feeding detection sensor is provided, and results of the detections of the detection sensor are fed back to adjust automatically a nip pressure between the feed roller and the separation roller. In Japanese Unexamined Patent Publication No. 08-188286, there is proposed an apparatus wherein a sheet thickness detection sensor is provided, and an object is to enhance reliability of sheet feeding by controlling separately the speed of rotation of the feed roller and the speed of rotation of the separation roller, based on information of the detection.

The sheet feeder of the FRR system has the following problems. In general, the separation roller tends to be worn away because it is driven to rotate constantly in the direction opposite to the sheet conveyance direction while it keeps touching the feed roller at a prescribed pressure, thus, it has a tendency to be lower in terms of durability, compared with an ordinary rubber roller. When a sheet having lots of paper dust or a sheet which has been subjected to offset printing passes through the rollers, paper dust, dusting powder and ink sediment adhere the pickup roller, the feed roller and the separation roller to lower friction of rollers, which sometimes causes conveyance troubles. Further, when a thin sheet passes through, the sheet is sometimes damaged by actions of these friction rollers.

On the other hand, when a thin sheet and a sheet having lots of paper dust pass through rollers, an air suction belt sheet feeding system employing no friction roller is effective. However, a sheet feeding apparatus of the air suction belt sheet feeding system has the following problems. For example, when feeding a thick sheet, the suction power for conveying the sheet needs to be great, resulting in a large-sized apparatus, which is a weak point. Further, when feeding a thick sheet, the sheet sometimes fails to pass through a sheet separating pad made of rubber material provided to close a sheet path, which sometimes requires to change position setting for the sheet separating pad depending on a type of the sheet and on weight.

In the sheet feeding apparatus, conditions for sheet feeding and separation are changed variously depending on a type and weight of the sheet or on environmental circumstances, as stated above. Therefore, in the case where the sheet feeding apparatus is used on a multipurpose basis, and a sheet feeding means of an FRR sheet feeding system or a sheet feeding means of an air suction belt sheet feeding system is employed independently, the problems of double feeding or sheet feeding troubles cannot be solved sufficiently, and securing of reliable sheet feeding is sometimes difficult.

A sheet feeding apparatus employing both the FRR sheet feeding system and an air assist system to supply air from a side guide of a sheet-feeding table and to separate a sheet, is effective and has been put to practical use. However, this sheet feeding apparatus has problems that when a sheet having lots of paper dust or a sheet which has subjected to offset printing passes through the rollers, paper dust, dusting powder and ink sediment adhere the rollers, to lower friction of rollers, which causes conveyance troubles, in addition to establishment of conditions for a position for an air blast from the side guide and a rate of air flow, thus, a sheet feeding apparatus that is simple and is highly reliable has been demanded.

The invention has been proposed under the aforesaid circumstances, and an object of the invention is to provide a sheet feeding apparatus wherein a sheet feeding section of FRR system is arranged at the downstream side of a sheet feeding section of an air suction belt sheet feeding system, in view of the point that an FRR system has a weak point slightly for feeding a thin sheet and an air suction belt sheet feeding system has a weak point slightly for feeding a thick sheet, and high sheet feeding ability for a wide range of sheet types are realized by activating selectively sheet separating devices of both systems and durability of a friction roller is improved by controlling working hours for rotation of a separation roller.

SUMMARY OF THE INVENTION

In an aspect of the invention, there is provided a sheet feeding apparatus comprises, a sheet tray in which a plurality of sheets are to be stacked; a sheet feeding section which vacuums a sheet from the plurality of sheets stacked in the sheet tray and feeds the sheet to an image forming apparatus; a first sheet separator which comprises, a member which separates each sheet from the plurality of sheets when the sheet feeding section feeds the plurality of sheets; and a second sheet separator which comprises, a forward roller rotated in a sheet transport direction, which feeds the sheet to the image forming apparatus, and a parallel retard roller rotatable in an opposite direction so as to separate each sheet from the plurality of sheets.

In a second aspect of the invention, there is provided a sheet feeding apparatus comprises, a sheet tray in which a plurality of sheets are to be stacked; a sheet feeding section which vacuums a sheet from the plurality of sheets stacked in the sheet tray and feeds the sheet to an image forming apparatus; and a sheet separating section which separates each sheet from the plurality of sheets when the sheet feeding section feeds the plurality of sheets.

In a third aspect of the invention, there is provided an image forming system comprises, an image forming apparatus that comprises an image forming section which forms an image on a sheet; a sheet feeding apparatus which comprises, a sheet tray in which a plurality of sheets is to be stacked; a sheet feeding section which vacuums a sheet from the plurality of sheets stacked in the sheet tray and feeds the sheet to an image forming apparatus; a first sheet separator which comprises, a member which separates each sheet from the plurality of sheets when the sheet feeding section feeds the plurality of sheets; and a second sheet separator which comprises, a forward roller rotated in a sheet transport direction, which feeds the sheet to the image forming apparatus; and a parallel retard roller rotatable in an opposite direction so as to separate each sheet from the plurality of sheets.

PREFERRED EMBODIMENT FOR PRACTICING THE INVENTION

Figure 1:
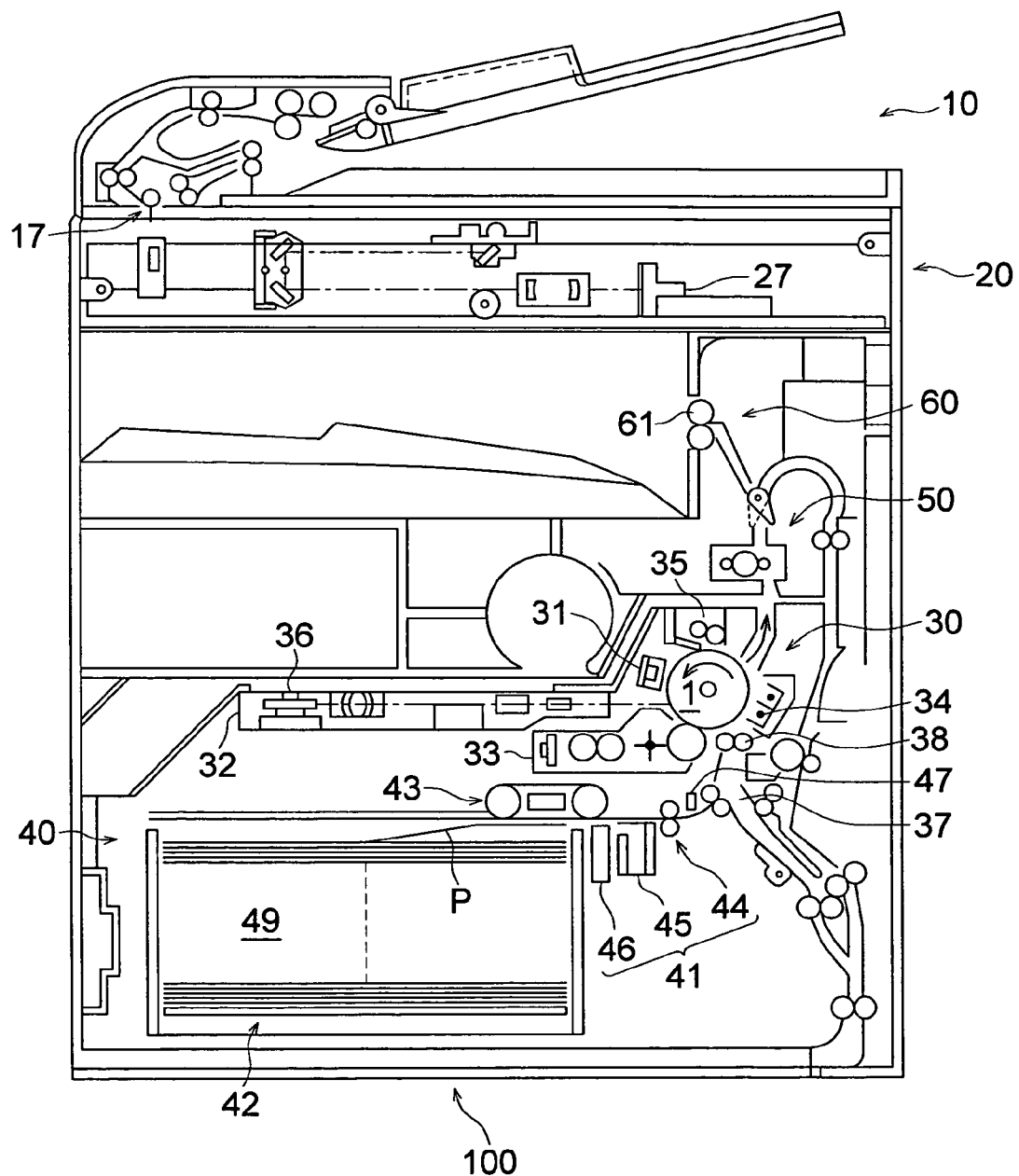
FIG. 1 is an overall structural view of an image forming system representing an embodiment of the invention.

An embodiment of the image forming apparatus relating to the invention will be explained as follows, referring to the drawings attached. FIG. 1 is an overall structural view of an image forming system 100 representing an embodiment of the invention. This image forming system 100 is structured with automatic document feeder 10 representing an image inputting section, image reading section 20, image forming apparatus 30, sheet feeding apparatus 40, fixing unit 50 and sheet ejection section 60. On the upper part of the image forming system 100, there are mounted the image reading section 20 and the automatic document feeder 10 which is located above the image reading section 20.

An image on a document which is conveyed by automatic document feeder 10 is read by image reading section 20 when the document passes through slit glass 17. CCD sensor 27 of the image reading section 20 converts optical images of the document thus read into electronic image data and transmits them to an image processing section (not shown). The image processing section conducts analog processing, A/D conversion, shading correction and image compression processing on the electronic image data, and then, transmits data of digitized image information to image forming apparatus 30.

The image forming apparatus 30 has, on its center, drum-shaped photoreceptor 1 on which an electrostatic latent image is formed, and charging unit 31 that charges the surface of the photoreceptor 1 almost evenly, exposure unit 32, developing unit 33, transfer separation unit 34 and cleaning unit 35 are arranged, in the order of image forming operations, along the outer circumferential surface of the photoreceptor 1.

In the exposure unit 32 of the image forming apparatus 30, a semiconductor laser is electrically modulated based on digitized image information data, and sub-scanning is carried out by both polyhedral reflecting mirror 36 polygon mirror) and correction lens groups. When the photoreceptor 1 is further rotated, main scanning is carried out, and the electrostatic latent image of the image of the document is reproduced on the photoreceptor 1.

Prior to exposure, prescribed surface potential is given on the photoreceptor 1 by corona discharge of charging unit 31, and irradiation of a laser beam reduces electric charges on the exposed portion depending on an amount of exposure, resulting in formation of electrostatic latent images on respective the photoreceptors 1 depending on image information data. The electrostatic latent image is visualized by developer supplied from the developing unit 33, to become a toner image.

On the lower part of the image forming apparatus 100, there is provided sheet feeding apparatus 40 that supplies recording sheet P to image forming apparatus 30. The sheet feeding apparatus 40 has large capacity sheet feeding tray 49, and on the bottom portion of the sheet feeding tray 49 on which recording sheets P are loaded, there is arranged movable plate 42 that is lifted upward by a lifting device. The movable plate 42 receives sheet feeding start signals to rise until the uppermost portion of recording sheet P arrives at the upper limit position limited by the upper limit detection sensor.

Sheet feeding unit 41 is provided on the sheet feeding section 40. The sheet feeder 41 is structured with main elements including suction delivery section (sheet feeding section) 43 that vacuums recording sheet P to be placed on sheet feeding tray 49 from the uppermost portion to send it out to conveyance path 37 and separation delivery section 44 that is arranged at the downstream side of the suction delivery section 43 in the sheet conveyance direction, and feeds recording sheet P one by one into conveyance path 37 by separating recording sheet P with a friction roller.

Recording sheet P vacuumed by the suction delivery section 43 is ejected from sheet feeding tray 49 by suction belt conveyance of suction delivery section 43, and is separated one by one by separation delivery section 44 having a pair of rollers to be sent out to conveyance path 37, and then, is conveyed to an intermediate roller and registration roller 38 to be sent to image forming apparatus 30. Toner images formed on the surface of the photoreceptor 1 are collectively transferred onto a recording sheet in transfer separation unit 34, and unfixed toner images thus transferred are heated and fixed on recording sheet P by fixing unit 50, and then, is guided by sheet ejection roller 61 to be ejected out of the apparatus.

Figure 2:
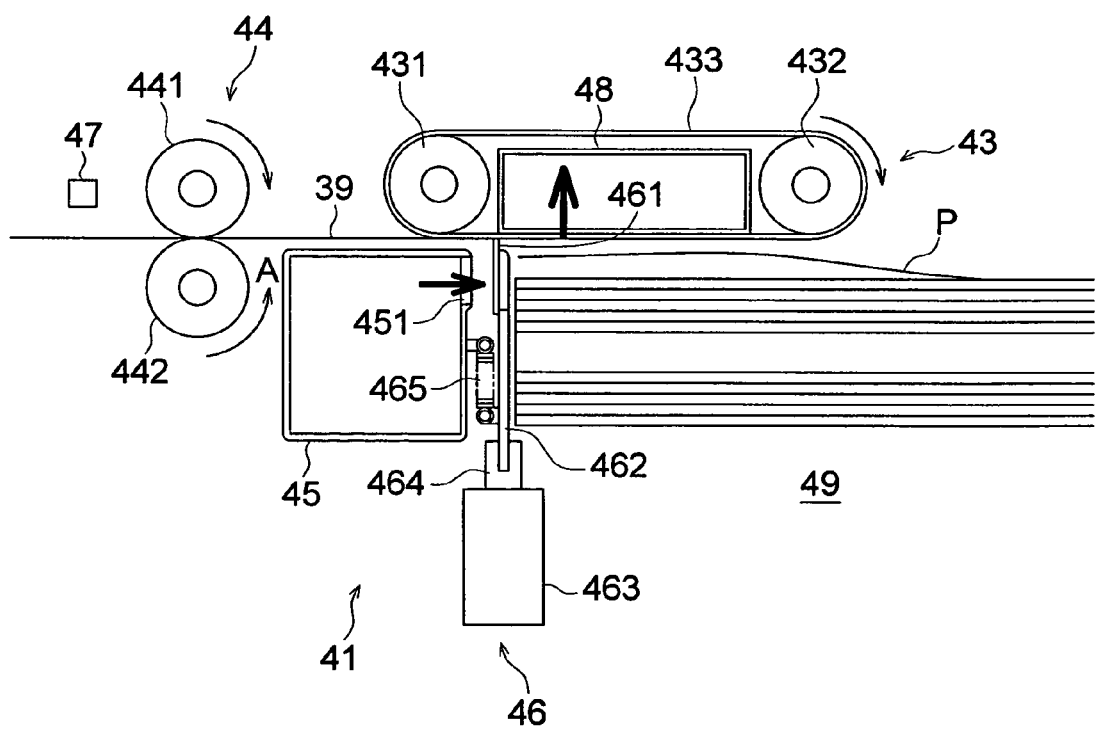
FIG. 2 is a structural diagram for illustrating actions and functions of a sheet feeding apparatus that is feeding a medium thick sheet normally.
Figure 3:
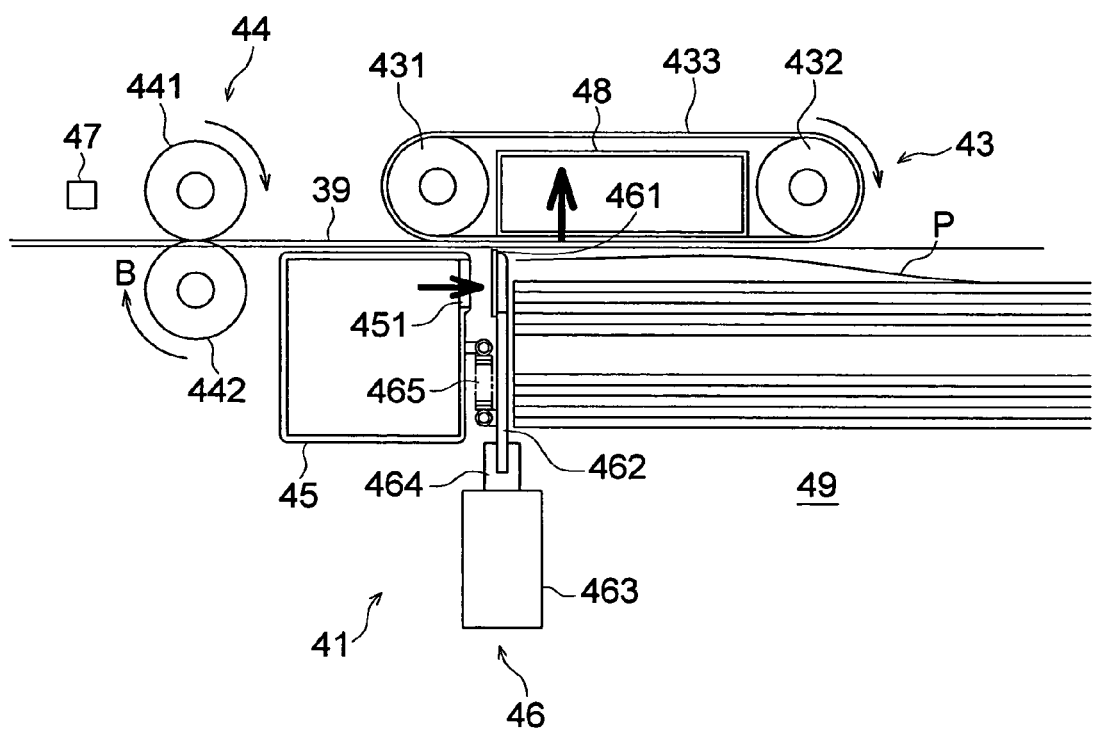
FIG. 3 is a structural diagram for illustrating actions and functions of a sheet feeding apparatus in the case of double feeding.

Each of FIGS. 2 and 3 shows an example of sheet feeder 41 relating to the invention. FIG. 2 is a structural diagram for illustrating actions and functions of the sheet feeder 41 that is feeding a regular sheet normally, and FIG. 3 is a structural diagram for illustrating actions and functions of the sheet feeder 41 in the case of double feeding. A portion in each of FIGS. 2 and 3 that shows the same symbol as that in FIG. 1 is given the same symbol.

On sheet feeder 41 shown in each of FIGS. 2 and 3, there are provided suction delivery section 43 that is arranged above sheet feeding tray 49 as stated above, and vacuums uppermost recording sheet P on recording sheets P placed and conveys it to the outside of the sheet feeding tray 49 with suction belt 433 and separation delivery section 44 arranged at the downstream side of the suction delivery section 43 in the conveyance direction for the suction delivery section 43.

The separation delivery section 44 is constituted so that recording sheet P is superposed by a nip portion that is formed when a pair of friction rollers come in pressure contact, and the recording sheet P is conveyed by rotation of the friction rollers. Specifically, the separation delivery section 44 is structured with conveyance roller (forward roller) 441 that conveys recording sheet P fed out by the suction delivery section 43 in the sheet conveyance direction by frictional rotation force and of separation roller (parallel retard roller) 442 that is in pressure contact with the conveyance roller 441 at a prescribed pressure to be driven to rotate inversely, and changes its rotational direction depending on presence or absence of double feeding of recording sheet P.

Below sheet conveyance path 39 located between the suction delivery section 43 and the separation delivery section 44, there is arranged air duct 45 that has opening 451 at the position facing an upper end portion of recording sheets P loaded on sheet feeding tray 49. This air duct 45 blows air against the upper end portion of recording sheets P to lift an end portion of recording sheet P in the course of sheet feeding, and conducts simultaneously separation handling for adhesiveness between recording sheets.

Between the air duct 45 and the sheet feeding tray 49, there is provided elastic separating pad 461 (advance-resisting member) that is positioned on the sheet conveyance path 39 to come in contact with recording sheet P vacuumed by the suction delivery section 43, and to conduct separation of recording sheet P by frictional resistance. This elastic separating pad 461 is of the structure wherein when the suction delivery section 43 feeds out only one recording sheet P, suction force of the suction delivery section 43 overcomes friction force to convey the recording sheet P as it is, while, when two or more sheets are vacuumed, friction resistance between the elastic separating pad 461 and recording sheet P overcomes friction force between recording sheets, and only one sheet on the bottom can be sent back to the sheet feeding tray 49 side.

If an advance-resisting section that separates a sheet fed out by a suction delivery section is provided on a sheet conveyance path located between the suction delivery section and the separation feeding section, it is possible to conduct separation sheet feeding for a sheet by using only a sheet feeding section of an air suction system, and thereby to operate the sheet feeding apparatus effectively, while improving durability of a separation roller of the separation delivery section.

The elastic separating pad 461 is made of elastic material such as rubber, and it can move selectively between a separation working position where it is mounted on one end of movable member 462 and intercepts sheet conveyance path 39 depending on the movement of the movable member 462 and a retreating position where it is retreated downward from the sheet conveyance path 39.

By providing a movement control section that moves the advance-resisting member selectively between a separation working position and a retreating position, it is possible to separate sheets by using selectively either a separation roller of the separation feeding section or an advance-resisting member, depending on a type and weight of a sheet or on the circumstances. As a result, stable sheet conveyance force can be secured, and decline of conveyance force of the separation roller can be prevented, even when a sheet having lots of paper dust or a sheet which has been subjected to offset printing and has dusting powder passes through the rollers.

The control of movement of the elastic separating pad 461 is conducted by electromagnetic solenoid 463 and by movement control section 46 structured with one spring 465. An end portion of the movable member 462 having the elastic separating pad 461 and its opposite end portion are connected to plunger 464 of the electromagnetic solenoid 463, and one end of the spring 465 is attached near the end portion. The other end portion of the spring 465 is fixed on the side wall of air duct 45, and the spring 465 is usually urging the elastic separating pad 461 to be at the separation working position.

If an electric current is sent to the electromagnetic solenoid 463, the plunger 464 overcomes urging force of the spring 465 to be vacuumed in the electromagnetic solenoid 463, resulting in moving the movable member 462 downward, thus, the elastic separating pad 461 is retreated to the retreating position (see FIG. 3). When an electric current is intercepted, the elastic separating pad 461 is returned to the separation working position by urging force of the spring 465 (see FIG. 2).

Figure 4:
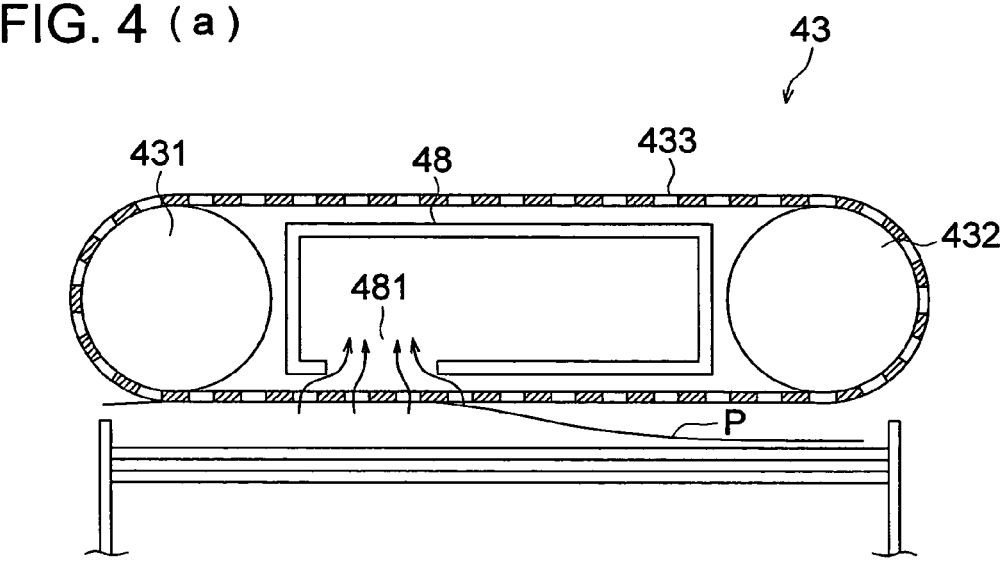
FIG. 4(a) is a transverse cross section of an example of the structure of a suction delivery section (sheet feeding section)
FIG. 4(b) is a top surface view of an example of the structure of the suction delivery section.
Figure 4:
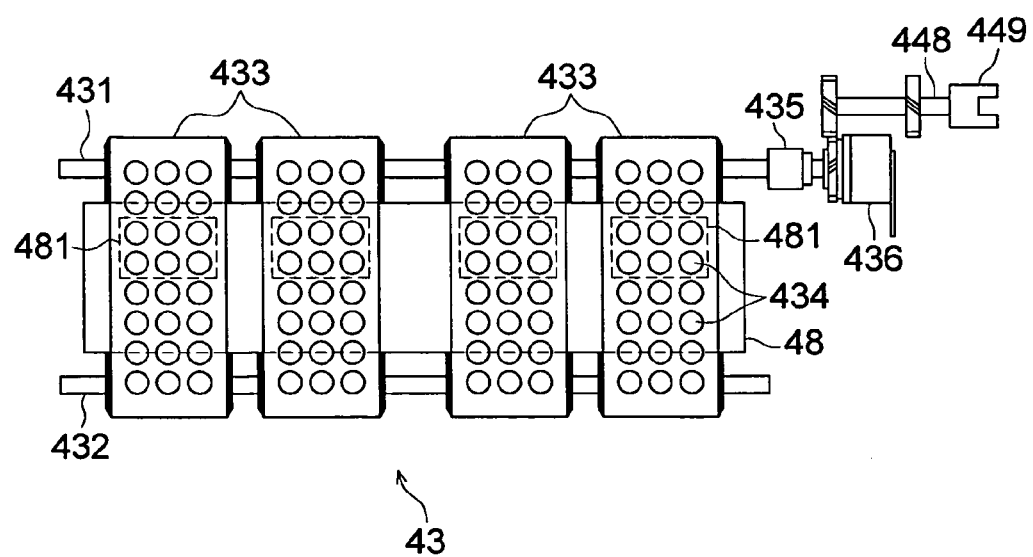

FIG. 4 shows an example of a structure of suction delivery section 43. FIG. 4(*a*) is a transverse cross section of the suction delivery section 43, and FIG. 4(*b*) is a top surface view. The suction delivery section 43 is structured with four suction belts 433 trained about one drive roller 431 and one driven roller 432, and of suction duct 48 that is arranged inside a revolving drive path of the trained suction belt 433 and generates suction force by an unillustrated suction fan.

On the suction duct 48, opening section 481 is provided at the position that faces recording sheet P placed on sheet feeding tray 49 and is at the downstream side in the sheet conveyance direction, and suction force is given to the opening section 481 by lowering air pressure inside the suction duct 48 by a suction fan. Further, on the substantially entire surface of the suction belt 433, there are formed bents 434 arranged longitudinally and laterally, and suction force of the suction duct 48 is applied on recording sheet P through the vents 434, whereby, recording sheet P is vacuumed to the suction belt 433.

Figure 5:
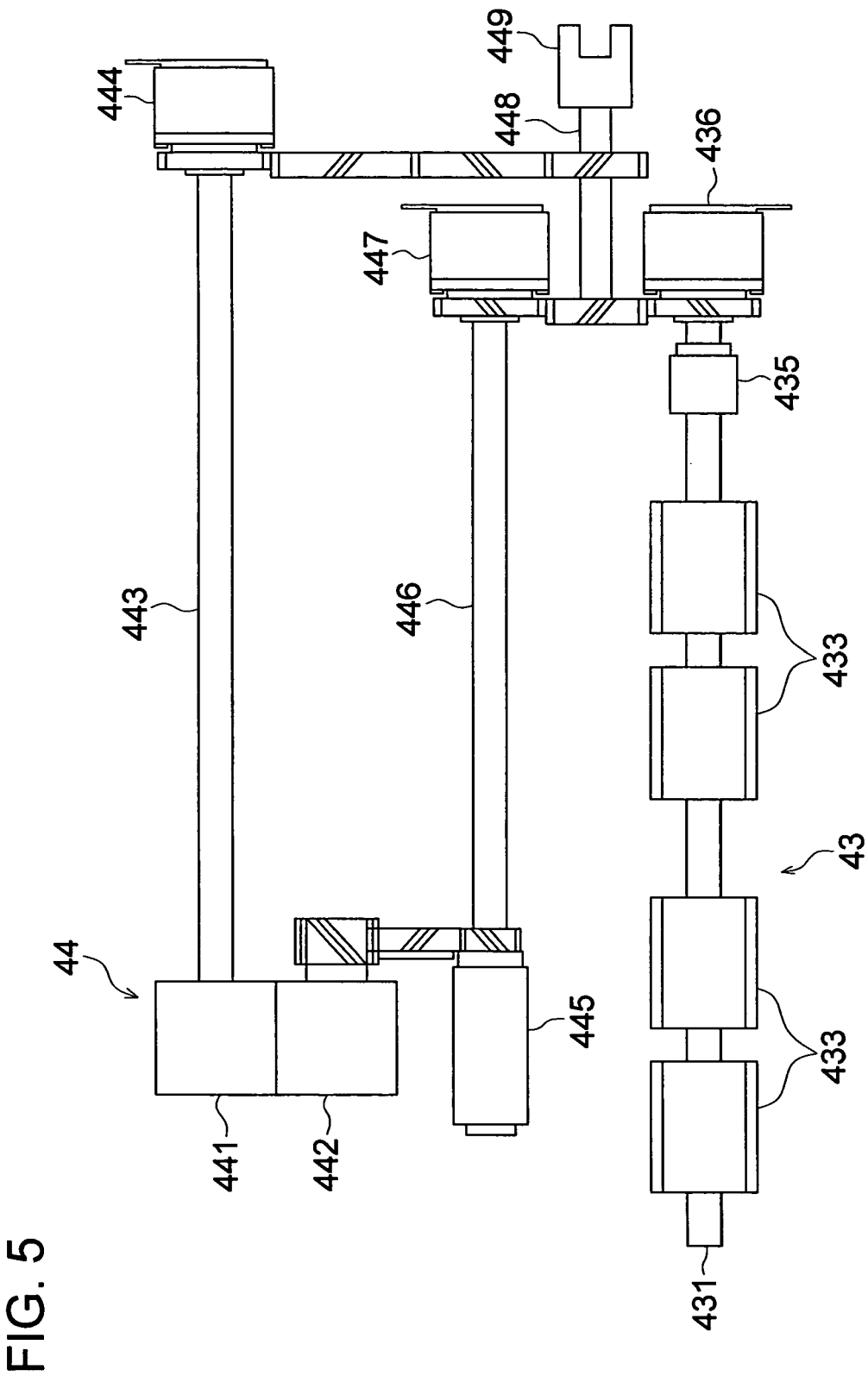
FIG. 5 is a structural diagram for drive transmission showing transmission of drive force of a sheet feeding apparatus.

FIG. 5 shows a structural diagram of drive transmission indicating transmission of drive force to suction delivery section 43 and to separation delivery section 44. As shown in FIG. 5, drive roller 431 is connected to drive input shaft 448 through one-way clutch 435 and electromagnetic clutch 436. It is therefore constituted so that, when drive force transmission is turned on by the electromagnetic clutch 436, rotation drive force is transmitted to drive roller 431, and when suction belt 433 conducts revolving drive around drive roller 431 and driven roller 432, vacuumed recording sheet P is conveyed to the outside of sheet feeding tray 49. Incidentally, the one-way clutch 435 is for preventing reverse rotation of the suction belt 433.

On the other hand, conveyance roller 441 of separation delivery section 44 has electromagnetic clutch 444 on one end of revolving shaft 443, and is connected to drive input shaft 448 through a plurality of gear trains. When drive force transmission is turned on by electromagnetic clutch 444, the conveyance roller 441 is driven to rotate in the direction to convey recording sheet P in the sheet conveyance direction (see FIGS. 2 and 3). When the electromagnetic clutch 444 is turned off, rotation following separation roller 442 is also possible.

Separation roller 442 that is in contact with conveyance roller 441 at a prescribed pressure is connected to revolving shaft 446 through torque limiter 445, and the revolving shaft 446 is connected to drive input shaft 448 through separation roller drive electromagnetic clutch 447. When drive force transmission is turned on by the separation roller drive electromagnetic clutch 447, the separation roller 442 is driven to rotate to convey recording sheet P in the direction opposite to the sheet conveyance direction (reverse rotation drive) (see FIG. 3). However, when a load that is equal to or greater than a prescribed torque is applied on revolving shaft 446 having torque limiter 445, the torque limiter operates so that a slip is generated for drive force transmission.

Specifically, when only one recording sheet P is fed to a nip portion formed between conveyance roller 441 and separation roller 442, or when no recording sheet is fed, a load to be applied on the separation roller 442 grows greater to cause a slip on the torque limiter 445, thus, it is impossible for the separation roller 442 to overcome the friction force for the conveyance roller 441 or for recording sheet P, and thereby to rotated in the direction opposite to the sheet conveyance direction, resulting in following the rotation of the conveyance roller 441 (see FIG. 2, arrow direction A).

On the other hand, when two or more recording sheets P are fed to a nip portion formed between conveyance roller 441 and separation roller 442, a load to be applied on the separation roller 442 is small because friction force between recording sheets is small, and no slip is caused on the torque limiter 445, whereby, drive force is transmitted to the separation roller 442 as it is, to rotate the separation roller 442 in the direction to return only lower recording sheet P among recording sheets P in double feeding to the sheet tray 49 (see FIG. 3, arrow direction B).

Incidentally, in the drive force transmission structure relating to the present example, drive input coupling 449 is provided on one end of drive input shaft 448, and by causing this drive input coupling to engage with a revolving shaft of an unillustrated drive motor, it is possible to give drive force to all drive systems from a single drive source. This is an example of structures, and the invention is not naturally limited to this drive force transmission structure.

Further, as shown in FIGS. 2 and 3, in sheet feeder 41 relating to an embodiment of the invention, double feeding detection sensor 47 is provided at the downstream side of sheet conveyance path 39 of separation delivery section 44. A supersonic detection sensor can be used as the double feeding detection sensor 47. For example, it is possible to detect double feeding by applying a supersonic wave on recording sheet P conveyed and by measuring intensity of a supersonic wave which has passed through the recording sheet P. Since the intensity decay for transmitted wave depending on the number of planes of incidence for supersonic wave is greater than that for transmitted wave depending on a thickness of recording sheet P in particular, excellent results for double feeding detection can be obtained.

If an arrangement is made to maintain a situation wherein a double feeding detection sensor is provided at the downstream side of a separation delivery section in the sheet conveyance direction, and reverse rotation drive force is transmitted to the separation roller when double feeding of sheets is detected by the double feeding detection sensor, it is possible to operate continuously the separation delivery section even when the sheet feeding apparatus fails to prevent double feeding, which can further enhances certainty of sheet feeding.

In the sheet feeding apparatus equipped with a double feeding detection sensor, when a thin sheet or a medium thick sheet is selected by the sheet type selection section, the advance-resisting section is arranged at a separation working position, and when a thick sheet is selected, the advance-resisting section is moved to the retreated position, it is possible to keep the sheet separating force and thereby to improve reliability and certainty of sheet feeding without damaging a sheet for sheets having strong adhesiveness, while, it is possible make returning easy for a thick sheet.

Operations of the sheet feeder 41 constituted above that is relating to the invention will be explained briefly, referring to FIG. 2 or FIG. 3. Recording sheet P whose leading edge is lifted by blow air sent out of air duct 45 is vacuumed by suction belt 433, and then, is sent out to sheet conveyance path 39 by a revolving drive of the suction belt 433. If elastic separating pad 461 is at the separation working position as shown in FIG. 2 in that case, recording sheet P is separated in accordance with transferring of recording sheet P.

Herein, means of separation is not limited to a separation roller with a torque limiter or separating pad, and other means such as a corner nail or the like can also be applied.

Following carrying out of recording sheet P from sheet feeding tray 49, suction belt 433 sends out recording sheet P to sheet conveyance path 39 by retreating a suction portion of recording sheet P in succession, and leads a leading edge of recording sheet P to a nip formed between conveyance roller 441 and separation roller 442. In this case, if reverse rotation drive force is transmitted to separation roller 442, separating by load torque of separation roller 442 can be carried out. When there is double feeding even after passing through these sheet separating means (elastic separating pad 461 and separation roller 442), double feeding detection sensor 47 that is arranged at the downstream side of separation delivery section 44 in the sheet conveyance direction detects double feeding, and its results are fed back to control separation roller drive electromagnetic clutch 447 and electromagnetic clutch 444 are controlled, and the direction of rotation of a roller of separation delivery section 44 is controlled.

In the sheet feeder 41 relating to the invention, not all of these sheet separating means are made to operate simultaneously, but its objective is to improve reliability of sheet feeding and to improve durability of sheet feeder 41, by operating under the optimum conditions in accordance with a type of a sheet or circumstances. A method of its operations will be explained as follows, referring to FIGS. 6 and 7. Incidentally, there is provided a sheet type selecting section on sheet feeder 41 or image forming apparatus 100 relating to the invention, although the sheet type selecting section is not illustrated. It is usually provided on a display operating section of image forming apparatus 100, and touch buttons are used for selection and inputting.

If there is arranged so that a sheet type selection section for inputting a type of a sheet is provided, and transmission of reverse rotation drive force to the separation roller, or movement to a separation working position of the advance-resisting member or retreating is selected to work, in accordance with the selected type of the sheet, it is possible to acquire a sheet feeding apparatus capable of coping with broad sheet types and the circumstances, which can improve not only reliability of sheet feeding but also durability of a sheet feeding means.

Figure 6:
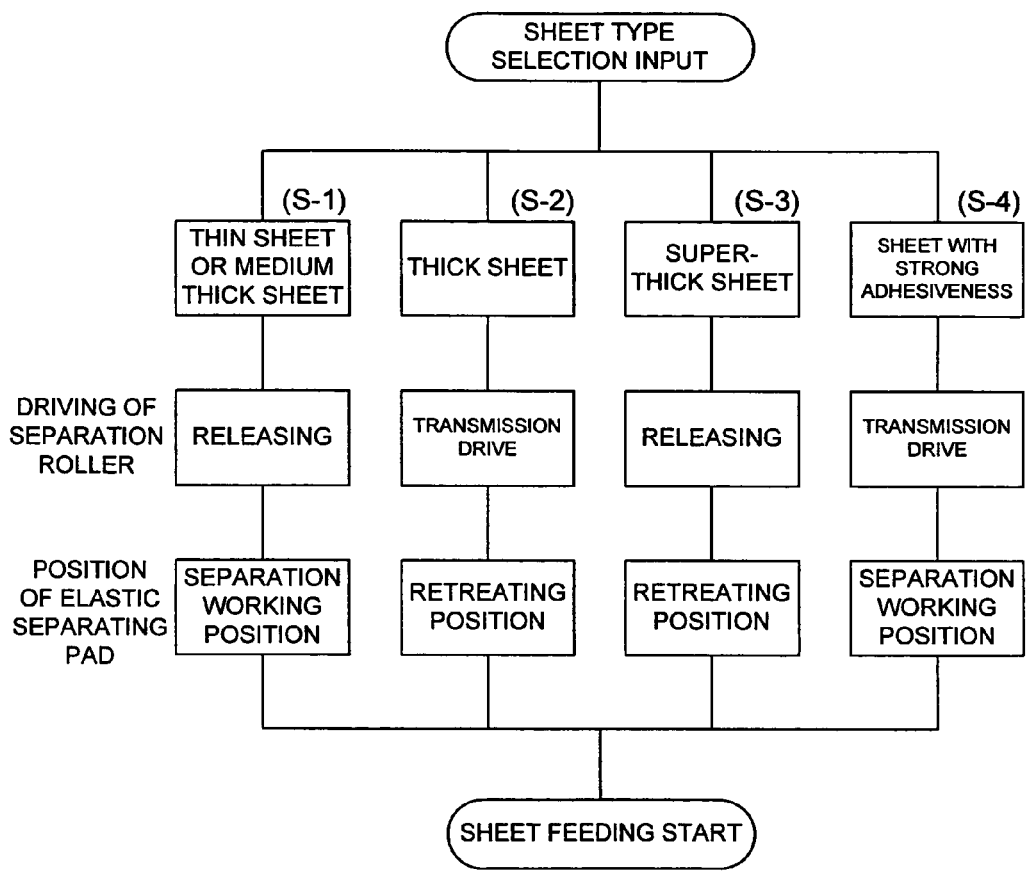
FIG. 6 is a graph showing driving of a separation roller (parallel retard roller) and a position of elastic separating pad both corresponding to a sheet type selected by a sheet type selecting section.

FIG. 6 is a graph showing driving of separation roller 442 and a position of elastic separating pad 461 both corresponding to a sheet type selected by a sheet type selecting section. As shown in FIG. 6, when feeding a thin sheet or a regular sheet from sheet feeding tray 49 (S-1), a thin sheet or a regular sheet is selected by the sheet type selecting section. Whereby, separation roller drive electromagnetic clutch 447 is turned off, and reverse rotation drive for separation roller 442 is released.

In the separation feeding section, if there is provided a transmission switching section that switches selectively between transmission and release of reverse rotation drive force to/from a separation roller, working hours for reverse rotation drive force of the separation roller can be reduced, and abrasion caused by rotation in contact with a conveyance roller can be reduced accordingly, resulting in an improvement of durability. As a result, a maintenance cycle for replacement is extended, and maintenance expenses are reduced.

Further, electromagnetic solenoid 463 of movement control section 46 is also turned off, and the elastic separating pad 461 is positioned at the separation working position. By conducting the selection of means of this kind, suction delivery section 43 only operates, thereby, a thin sheet is not damaged, and it is possible to prevent sheet feeding troubles caused by passing of a medium thick sheet having lots of paper dust and dusting powder or of a sheet which has been subjected to offset printing.

When feeding a thin sheet or a medium thick sheet from the aforesaid sheet feeding apparatus that is equipped with a separation delivery section and a transmission control section for its drive force, an advance-resisting member with its movement control section and a sheet type selection section, it is possible to make the sheet feeding to be the same as that by an ordinary air suction sheet feeding system with a friction roller, by releasing the transmission of reverse rotation drive force to a separation roller of the separation delivery section and moving the advance-resisting member to the separation working position. Owing to this, it is possible to conduct stable sheet feeding, without giving damages even in the case of separating a thin sheet. Even when a regular sheet having lots of paper dust or a sheet which has been subjected to offset printing passes through the rollers, less paper dust, less dusting powder and ink sediment adhere the friction roller, to prevent sheet feeding troubles caused by the lowered roller conveyance force.

When feeding a thick sheet from sheet feeding tray 49 (S-2), a thick sheet is selected by a sheet type selecting section. Whereby, separation roller drive electromagnetic clutch 447 is turned on, and thereby, rotation drive force is conveyed to separation roller 442. Further, electromagnetic solenoid 463 of movement control section 46 is turned on, and elastic separating pad 461 retreats to its retreating position. By conducting the selection of means of this kind, separation delivery section 44 only operates, thereby, it is not necessary to greaten suction power by making the suction delivery section 43 to be large-sized for thick sheet feeding, which makes it possible to downsize the sheet feeding apparatus as a whole. Further, a fine adjustment of a position of elastic separating pad 461 for a thick sheet becomes unnecessary, resulting in improvement of reliability of sheet feeding.

When feeding a thick sheet from the sheet feeding apparatus that is equipped with a separation delivery section and a transmission control section for its drive force, an advance-resisting member and its movement control section and with a sheet type selection section, it is possible to make its sheet feeding to be the same as an ordinary separation sheet feeding system by means of a friction roller, by transmitting reverse rotation drive force to the separation roller and by moving the advance-resisting member to its retreating position. Owing to the control of this kind, it is not necessary to enlarge suction power by making a suction delivery section large for the thick sheet feeding, and it is possible to make the sheet feeding section small. It is further possible to simplify the control mechanism because fine adjustment of setting position for the advance-resisting member is not needed.

When feeding a super-thick sheet from sheet feeding tray 49 (S-3), a super-thick sheet is selected by a sheet type selecting section. Whereby, separation roller drive electromagnetic clutch 447 is turned on, and thereby, reverse rotation drive force for separation roller 442 is released. Further, electromagnetic solenoid 463 of movement control section 46 is turned on, and elastic separating pad 461 retreats to its retreating position. For the super-thick sheet, stable sheet feeding is possible by eliminating operations of a sheet separating section, and it is possible to prevent decline of durability and sheet feeding troubles both caused by abrasion and adhesion of paper dust, by refraining from using contrary to the foregoing.

When feeding a super-thick sheet from the sheet feeding apparatus that is equipped with a separation delivery section and a transmission control section for its drive force, an advance-resisting member with its movement control section and with a sheet type selection section, it is not necessary to use a sheet separating section such as a separation roller and an advance-resisting section, because a sheet can generally be fed stably only by a suction delivery section. It is therefore possible to prevent a decline of durability caused by these abrasions and by adhesion of paper dust, and to prevent sheet feeding troubles. It is further possible to eliminate an occasion wherein a thick sheet cannot pass through the clearance formed between the advance-resisting section and the suction delivery section, which could cause sheet feeding troubles.

When feeding a sheet that easily sticks fast each other from sheet feeding tray 49 (S-4), a sheet having strong adhesiveness is selected by a sheet type selecting section. Whereby, separation roller drive electromagnetic clutch 447 is turned on, and thereby, rotation drive force is transmitted to separation roller 442. Further, electromagnetic solenoid 463 of movement control section 46 is turned off, and elastic separating pad 461 is positioned at the separation working position. By using two sheet separating means simultaneously by conducting selection means of this kind, it is possible to separate surely even for recording sheets P sticking fast each other.

When feeding sheets which tend to stick to each other from a sheet feeding apparatus that is equipped with a separation delivery section, an advance-resisting member and its movement control section and with a sheet type selection section, two sheet separating sections are used simultaneously, by transmitting reverse rotation drive force to a separation roller and by moving an advance-resisting member to a separation working position, which makes it possible to separate surely, even in the case of stuck sheets.

Figure 7:
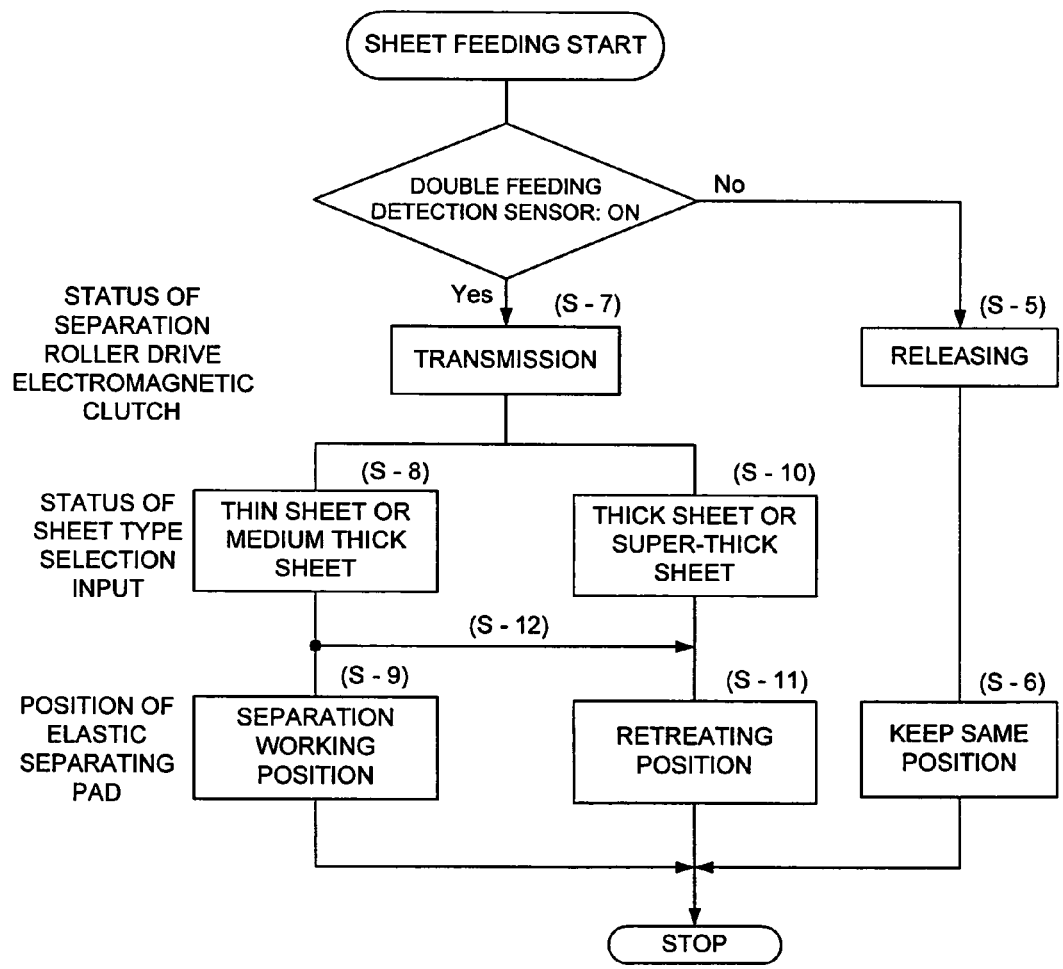
FIG. 7 is a control flow diagram in the case of operations of a double feeding detection sensor.

In the preferred embodiment, double feeding detection sensor 47 is provided at the downstream side of separation delivery section 44 in the sheet conveyance direction. After sheet feeding is started, there is sometimes an occasion wherein double feeding of recording sheet P cannot be prevented even when a position of the aforesaid sheet separating section (separation roller 442 and elastic separating pad 461) is controlled. It is therefore effective to conduct feedback control in accordance with results of detection by double feeding detection sensor 47. FIG. 7 shows a method of feedback control. FIG. 7 is a control flow diagram in the case of operations of the double feeding detection sensor 47.

When the double feeding detection sensor 47 judges that the number of conveyed recording sheet P is one, separation roller drive electromagnetic clutch 447 is turned off so that rotation drive force may not be conveyed to revolving shaft 446 (S-5). As a result, the separation roller 442 operates as a driven roller that rotates simply following conveyance roller 441. The elastic separating pad 461 may be left to keep the same position (S-6).

When the double feeding detection sensor 47 judges that the recording sheet P conveyed is in double feeding, separation roller drive electromagnetic clutch 447 is turned on and reverse rotation drive force is conveyed to revolving shaft 446 from drive input shaft 448 (S-7). Due to this, the separation roller 442 conducts separating continuously for recording sheets P to solve double feeding.

When the recording sheet P to be conveyed is a regular sheet or a thin sheet, in particular, (S-8), even when the separation roller 442 is driven to rotate inversely, decline of sheet separating force is prevented while keeping the elastic separating pad 461 at the separation working position (S-9). In the case of a thick sheet or a super-thick sheet, electromagnetic solenoid 463 is turned on concurrently with reverse rotation drive of separation roller 442 (S-10), a position of elastic separating pad 461 which has been in contact with suction belt 433 is moved to a retreating position (S-11). Due to this, sheet conveyance path 39 is released so that lower one of overlapped two recording sheets P may return easily to sheet feeding tray 49.

Incidentally, while separation roller drive electromagnetic clutch 447 is turned on and separation roller 442 is driven to rotate inversely, it is also effective control to retreat the elastic separating pad 461 to its retreating position independently of a type and condition of the sheet (S-12). The separation roller drive electromagnetic clutch 447 which is turned on is temporarily turned off at a point of time when the start of sheet feeding for successive recording sheet P by suction delivery section 43 becomes possible.

When double feeding is not resolved after starting reverse rotation drive of separation roller 442, it is also possible to turn off electromagnetic clutch 444 and thereby to turn off rotation drive of conveyance roller 441. Owing to this, the conveyance roller 441 rotates following the separation roller 442, thus, recording sheet P can be sent back to the sheet feeding tray 49 side.

In the sheet feeding apparatus relating to the invention, a suction delivery section (sheet feeding section) and a separation feeding section by frictional force are provided jointly, which makes it possible to cope with broad types of sheets. In particular, if this separation feeding section is structured with a separation roller that is driven through a conveyance roller and a torque limiter, it is possible to provide a sheet feeding apparatus wherein stability and reliability of separation sheet feeding have been improved for broader types of sheets.

In the sheet feeding apparatus in the present invention, it is also possible to improve reliability of sheet feeding by causing the advance-resisting member to be retreated constantly to the retreated position while the reverse rotation drive force is transmitted to the separation roller, and by making either one of sheet separating sections to operate by selecting it.

As stated above, in the sheet feeding apparatus of the invention, a separation delivery section of a separation separating system by a friction roller is provided at the downstream side of a suction delivery section or its sheet separating section, and the both sheet separating sections are operated selectively depending on a sheet type and situations, thus, excellent sheet feeding functions are obtained for various types of sheets, and working hours of reverse rotation drive for the separation roller can be controlled, which makes it possible to improve durability and reliability of rollers. Further, in an image forming system having therein the sheet feeding apparatus of the invention, stable sheet feeding can be secured, which is helpful for improvement of reliability of the image forming system.

As stated above, the invention makes it possible to provide a sheet feeding apparatus capable of coping with a broad range of sheet types. Incidentally, the sheet feeding apparatus of the invention is not limited to the embodiment mentioned above, and the disclosed embodiment can naturally be modified variously without departing from the spirit and scope of the invention.

What is claimed is:

1. A sheet feeding apparatus comprising:
   a sheet tray in which a plurality of sheets are to be stacked;
   a sheet feeding section which lifts a sheet upward by vacuum from the plurality of sheets stacked in the sheet tray and feeds the sheet to an image forming apparatus;
   a first sheet separator which comprises,
   an advance resisting member movable between a separation position where the advance resistance member comes in contact with the sheet vacuumed at the sheet feeding section and separates each sheet from the plurality of sheets when the sheet feeding section feeds the plurality of sheets and a retreat position where the advance resisting member is retreated from contact with the sheet; and
   a second sheet separator downstream of the first sheet separator in a conveyance path of the sheet, the second sheet separator comprises,
   a forward roller rotated in a sheet transport direction, which feeds the sheet to the image forming apparatus,
   a parallel retard roller which rotates in an opposite direction so as to separate each sheet from the plurality of sheets; and
   a sheet separator controller section which controls movement of the advance resisting member between the separation position and the retreat position.

2. The sheet feeding apparatus of claim 1, further comprising:
   a sheet type input section which inputs a type of sheet;
   a print information receiving section which receives print information regarding the type of sheet inputted through the sheet type input section; and
   the sheet separator controlling section controls the movement of the advance resisting member and controls driving power of the parallel retard roller based on the print information.

3. The sheet feeding apparatus of claim 2, wherein the sheet separator controlling section performs control such that the advance resisting member is moved to the separation position, and that the driving power is not transmitted to the parallel retard roller, when the print information receiving section has received the print information of a sheet having a first thickness or a sheet having a thickness which is less than the first thickness.

4. The sheet feeding apparatus of claim 3, wherein the sheet separator controlling section performs control such that the advance resisting member is moved to the retreat position, and that the driving power is transmitted to the parallel retard roller, when the print information receiving section received the print information of a sheet having a second thickness wherein the second thickness is greater than the first thickness.

5. The sheet feeding apparatus of claim 4, wherein the sheet separator controlling section performs control such that the advance resisting member is moved to the retreat position, and that the driving power is not transmitted to the parallel retard roller, when the print information receiving section received the print information of a sheet having a third thickness wherein the third thickness is greater than the second thickness.

6. The sheet feeding apparatus of claim 2, wherein the sheet separator controlling section performs control such that the advance resisting member is moved to the separation position, and that the driving power is transmitted to the parallel retard roller, when the print information which the print information receiving section has received through the sheet type input section comprises the print information of a sheet that adheres to another sheet stronger than a sheet having a predetermined adhesiveness.

7. The sheet feeding apparatus of claim 1, further comprising:
a double feeding detection sensor which detects a situation of feeding a plurality of sheets; and
the sheet separator controlling section performs control to transmit the driving power to the parallel retard roller, when the double feeding detection sensor has detected the situation of feeding a plurality of sheets.

8. A sheet feeding apparatus comprising:
a sheet tray in which a plurality of sheets are stacked;
a sheet feeding section which lifts a sheet upward by vacuum from the plurality of sheets stacked in the sheet tray and feeds the sheet to an image forming apparatus; and
a sheet separating section which separates each sheet from the plurality of sheets when the sheet feeding section feeds the plurality of sheets, the sheet separating section comprising:
an advance resisting member movable between a separation position where the advance resistance member comes in contact with the sheet vacuumed at the sheet feeding section and separates each sheet from the plurality of sheets when the sheet feeding section feeds the plurality of sheets and a retreat position where the advance resisting member is retreated from contact with the sheet;
a forward roller rotated in a sheet transport direction, which feeds the sheet to the image forming apparatus;
a parallel retard roller which rotates in an opposite direction so as to separate each sheet from the plurality of sheets;
an advance resisting member controlling section which controls movement of the advance resisting member between the separation position and the retreat position
a roller controlling section which controls a driving power of the parallel retard roller; and
a driving power selecting section which selects whether to transmit the driving power to the parallel retard roller.

9. The sheet feeding apparatus of claim 8, further comprising:
a sheet type input section which inputs a type of sheet; and
a print information receiving section which receives print information regarding the type of sheet inputted through the sheet type input section,
wherein the roller controlling section controls the driving power of the parallel retard roller based on the print information.

10. The sheet feeding apparatus of claim 8, further comprising
a sheet type input section which inputs a type of sheet; and
a print information receiving section which receives print information regarding the type of sheet inputted through the sheet type input section,
wherein the advance resisting member controlling section controls the movement of the advance resisting member based on the print information.

11. The sheet feeding apparatus of claim 8, further comprising:
a double feeding detection sensor which detects a situation of feeding a plurality of sheets;
wherein the roller controlling section performs control to transmit the driving power to the parallel retard roller, when the double feeding detection sensor has detected the situation of feeding a plurality of sheets.

12. An image forming system comprising:
an image forming apparatus that comprises an image forming section which forms an image on a sheet;
a sheet feeding apparatus which comprises,
a sheet tray in which a plurality of sheets are to be stacked;
a sheet feeding section which lifts a sheet upward by vacuum from the plurality of sheets stacked in the sheet tray and feeds the sheet to the image forming apparatus;
a first sheet separator which comprises,
an advance resisting member movable between a separation position where the advance resistance member comes in contact with the sheet vacuumed at the sheet feeding section and separates each sheet from the plurality of sheets when the sheet feeding section feeds the plurality of sheets and a retreat position where the advance resisting member is retreated from contact with the sheet;
a second sheet separator downstream of the first sheet separator in a conveyance path of the sheet, the second sheet separator comprises,
a forward roller rotated in a sheet transport direction, which feeds the sheet to the image forming apparatus; and
a parallel retard roller which rotates in an opposite direction so as to separate each sheet from the plurality of sheets;
a sheet separator controller section which controls movement of the advance resisting member between the separation position and the retreat position.

13. The image forming system of claim 12,
wherein the image forming apparatus, further comprising;
a sheet type input section which inputs a print information including a type of sheet; and
the sheet separator controlling section controls the movement of the advance resisting member and controls driving power of the parallel retard roller, based on the print information including the type of sheet inputted through the sheet input type section.

14. The image forming system of claim 12, wherein the sheet feeding apparatus further comprising:
a double feeding detection sensor which detects a situation of feeding a plurality of sheets; and
the sheet separator controlling section performs control to transmit a driving power to the parallel retard roller, when the double feeding detection sensor detected the situation of feeding a plurality of sheets.

* * * * *